US012766783B2

(12) United States Patent
Yoshikawa et al.

(10) Patent No.: US 12,766,783 B2
(45) Date of Patent: Oct. 20, 2026

(54) ADDITIVE MANUFACTURING METHOD

(71) Applicant: KOBE STEEL, LTD., Hyogo (JP)

(72) Inventors: Akinori Yoshikawa, Hyogo (JP); Masatoshi Hida, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 938 days.

(21) Appl. No.: 17/999,134

(22) PCT Filed: May 14, 2021

(86) PCT No.: PCT/JP2021/018515

§ 371 (c)(1),
(2) Date: Nov. 17, 2022

(87) PCT Pub. No.: WO2021/235369

PCT Pub. Date: Nov. 25, 2021

(65) Prior Publication Data

US 2023/0191690 A1 Jun. 22, 2023

(30) Foreign Application Priority Data

May 20, 2020 (JP) ................................ 2020-088114

(51) Int. Cl.
*B29C 64/118* (2017.01)
*B23K 9/032* (2006.01)
(Continued)

(52) U.S. Cl.
CPC ............ *B29C 64/118* (2017.08); *B23K 9/032* (2013.01); *B23K 9/04* (2013.01); *B23K 9/0956* (2013.01);
(Continued)

(58) Field of Classification Search
CPC ..... B29C 64/10; B29C 64/118; B29C 64/393; B23K 9/032; B23K 9/04; B23K 9/042;
(Continued)

(56) References Cited

U.S. PATENT DOCUMENTS

2009/0107961 A1 4/2009 Zaffino et al.
2019/0134732 A1 5/2019 Sakai et al.
(Continued)

FOREIGN PATENT DOCUMENTS

JP S63-084776 A 4/1988
JP H09-182962 A 7/1997
(Continued)

OTHER PUBLICATIONS

Qinglin Han et al.; "Online Control of Deposited Geometry of Multi-layer Multi-bead Structure for Wire and Arc Additive Manufacturing"; Springer Nature Singapore Pte Ltd.; Transactions on Intelligent Welding Manufacturing; No. 1; Aug. 3, 2017; pp. 85-93.
(Continued)

*Primary Examiner* — Justin C Dodson
(74) *Attorney, Agent, or Firm* — Studebaker Brackett PLLC

(57) ABSTRACT

The shape profile of an existing weld bead is measured by a non-contact type shape sensor provided integrally with a welding torch on a robot tip end shaft, midway through molding of a laminate molded object on the basis of a lamination trajectory plan. First geometric information relating to the bead shape is extracted from the shape profile and the target position of the welding torch, second geometric information corresponding to the first geometric information is extracted from the deposition track plan, and an offset amount is calculated from the first geometric information and the second geometric information. In accordance with the offset amount, the deposition track plan is updated by updating at least one of the bead height and the bead width of the weld bead determined by the deposition track plan, and the welding conditions are updated in accordance with the update result of the deposition track plan.

9 Claims, 15 Drawing Sheets

(51) Int. Cl.

| | |
|---|---|
| ***B23K 9/04*** | (2006.01) |
| ***B23K 9/095*** | (2006.01) |
| ***B29C 64/393*** | (2017.01) |
| *B33Y 10/00* | (2015.01) |
| *B33Y 50/02* | (2015.01) |

(52) U.S. Cl.
CPC ............. *B29C 64/393* (2017.08); *B33Y 10/00* (2014.12); *B33Y 50/02* (2014.12)

(58) Field of Classification Search
CPC ...... B23K 9/044; B23K 9/0956; B33Y 10/00; B33Y 50/02
See application file for complete search history.

(56) References Cited

U.S. PATENT DOCUMENTS

| | | | | |
|---|---|---|---|---|
| 2019/0377326 | A1* | 12/2019 | Katogi | B23K 26/0853 |
| 2020/0130264 | A1* | 4/2020 | Fukase | B22F 10/30 |
| 2020/0324356 | A1 | 10/2020 | Yamasaki et al. | |
| 2020/0368815 | A1* | 11/2020 | Baker | B29C 64/386 |
| 2021/0229182 | A1 | 7/2021 | Yamasaki et al. | |

FOREIGN PATENT DOCUMENTS

| | | | |
|---|---|---|---|
| JP | 2020-001059 | A | 1/2020 |
| JP | 6797324 | B1 | 12/2020 |
| KR | 10-2019-0137254 | A | 12/2019 |
| WO | 2019/098006 | A1 | 5/2019 |
| WO | 2019/167274 | A1 | 9/2019 |

OTHER PUBLICATIONS

B M Berezovskii et al.; "Optimisation of the Formation of a Metal Layer in Arc Deposition"; Wielding International, 1991, vol. 5, No. 11; pp. 888-891.

International Search Report issued in PCT/JP2021/018515; mailed Jul. 27, 2021.

Written Opinion of the International Searching Authority issued in PCT/JP2021/018515; mailed Jul. 27, 2021.

The extended European search report issued by the European Patent Office on Nov. 6, 2023, which corresponds to European Patent Application No. 21808495.2-1103 and is related to U.S. Appl. No. 17/999,134.

* cited by examiner (A)

(B)

(C)

(A)

(B)

(C)

(A)

(B)

(C)

(A)

(B)

(A)

(B)

ADDITIVE MANUFACTURING METHOD

TECHNICAL FIELD

The present invention relates to an additive manufacturing method.

BACKGROUND ART

A technique of controlling a welding robot to manufacture an additively-manufactured object constituted by a multi-layered weld bead is developed (see, for example, Patent Literatures 1 and 2 and Non-patent Literature 1).

Patent Literature 1 describes a method of adjusting a target position, a welding current, a welding voltage, and the like of a welding torch when welding iron poles for construction, by measuring a shape of a welded weld bead in real time with a laser sensor and selecting welding conditions from a database according to the measured bead shape.

Non-patent Literature 1 describes a method of adjusting a height and a width of a weld bead to be formed in additive manufacturing with molten wires, by controlling a welding voltage and a welding speed according to a bead shape measured by a laser sensor.

Patent Literature 2 describes a method for adjusting a target position for next bead formation in multi-layer welding. In this method, a shape of a weld bead formed on a flat plate is measured, and a bead shape approximation function is obtained from the measurement result. Then, a bead shape prediction function of a weld bead formed when there is an inclined wall plate on both sides of the bead is obtained using this bead shape approximation function. It is described that the target position for the bead formation is set to either a position of a minimum bead height or a position of an intersection of the bead and the inclined wall plate according to the obtained bead shape prediction function.

CITATION LIST

Patent Literature

Patent Literature 1: JPH09-182962A
Patent Literature 2: JPS63-84776A

Non-Patent Literature

Non-patent Literature 1: Han Q., Li Y, Zhang G. (2018) Online Control of Deposited Geometry of Multi-layer Multi-bead Structure for Wire and Arc Additive Manufacturing. In: Chen S., Zhang Y, Feng Z. (eds) Transactions on Intelligent Welding Manufacturing. Transactions on Intelligent Welding Manufacturing. Springer, Singapore

SUMMARY OF INVENTION

Technical Problem

As described above, it is necessary to accurately control the width and the height of each weld bead so as to manufacture an additively-manufactured object with high accuracy. Therefore, as in Patent Literature 1 and Non-patent Literature 1, when measuring the shape of the formed weld bead and then performing feedback control of the bead formation position, welding conditions, and the like in the next step, in order to shorten a tact time of the step, the measurement is required to be in real time and in a high speed. However, in general, when measuring the bead shape using a laser sensor, variation in detected values is generally large due to light receiving sensitivity of the sensor, linearity of the bead, and the like. Therefore, it takes time to perform stable measurement, and it is difficult to speed up the measurement.

When controlling a tip position of a welding torch to form the weld bead, a groove can be used in normal groove welding to enable highly accurate positioning. However, when manufacturing an additively-manufactured object by padding, there is no absolute positioning reference such as a groove. Therefore, the bead shape approximation function cannot be obtained based on the position of the inclined side plate arranged on both sides of the bead as in Patent Literature 2. In addition, the approximation calculation of the bead shape becomes complicated, approximation accuracy is lowered, and accuracy of the predicted bead shape is lowered. Furthermore, since the formed weld bead changes depending on conditions such as a protrusion length of a welding wire (filler metal) that protrudes from a tip of the torch, and a close distance to a surrounding bead, the target position for the bead formation may be displaced, or welding may become unstable due to adhesion of spatter.

Accordingly, an object of the present invention is to provide an additive manufacturing method capable of accurately obtaining the target position for the bead formation and manufacturing an additively-manufactured object with high accuracy.

Solution to Problem

The present invention includes following constitutions.

(1) An additive manufacturing method of depositing weld beads formed by melting and solidifying a filler metal while moving a welding torch attached to a robot tip shaft, the additive manufacturing method including:

a step of measuring a shape profile of an existing weld bead by a non-contact shape sensor provided on the robot tip shaft integrally with the welding torch, during manufacture of an additively-manufactured object by forming the weld beads, based on a deposition track plan that defines a target position of the welding torch and a shape of the weld beads;

a step of extracting first geometric information of a bead shape from the shape profile and the target position of the welding torch;

a step of extracting second geometric information corresponding to the first geometric information from the deposition track plan and calculating a deviation amount between the first geometric information and the second geometric information;

a step of updating the deposition track plan by changing at least one of a bead height and a bead width in a cross section perpendicular to a bead longitudinal direction of the weld bead defined by the deposition track plan, according to the deviation amount; and a step of changing a welding condition according to an update result of the deposition track plan, wherein the first geometric information and the second geometric information include information on at least one of a geometric feature point near the target position of the welding torch, the bead height, the bead width, a bead cross-sectional area of the weld bead, or a cross-sectional shape approximation curve indicating a bead outer shape of the weld bead, and the geometric feature point includes any one of an apex of a convex shape of the existing weld bead, an end point of a narrowed portion formed by recessing a bead outer surface inward between the weld bead and another weld bead adjacent to the weld bead, or a point where an end portion of the weld bead in a width direction and a lower layer surface on which the weld bead is formed intersect.

(2) An additive manufacturing method of depositing weld beads formed by melting and solidifying a filler metal while moving a welding torch attached to a robot tip shaft, the additive manufacturing method including:

a step of measuring a shape profile of an existing weld bead by a non-contact shape sensor provided on the robot tip shaft integrally with the welding torch, during manufacture of an additively-manufactured object by forming the weld beads, based on a deposition track plan that defines a target position of the welding torch and a shape of the weld beads;

a step of extracting first geometric information of a bead shape from the shape profile and the target position of the welding torch;

a step of extracting second geometric information corresponding to the first geometric information from the deposition track plan and calculating a deviation amount between the first geometric information and the second geometric information;

a step of updating the deposition track plan by changing at least one of a bead height and a bead width in a cross section perpendicular to a bead longitudinal direction of the weld bead defined by the deposition track plan, according to the deviation amount; and a step of changing a welding condition according to an update result of the deposition track plan, wherein the shape profile is a profile projected and transformed onto a plane including an axis of the welding torch, which is inclined at a predetermined angle from a plane parallel to a detection direction of the weld bead by the non-contact shape sensor.

(3) An additive manufacturing method of depositing weld beads formed by melting and solidifying a filler metal while moving a welding torch attached to a robot tip shaft, the additive manufacturing method including:

a step of measuring a shape profile of an existing weld bead by a non-contact shape sensor provided on the robot tip shaft integrally with the welding torch, during manufacture of an additively-manufactured object by forming the weld beads, based on a deposition track plan that defines a target position of the welding torch and a shape of the weld beads;

a step of extracting first geometric information of a bead shape from the shape profile and the target position of the welding torch;

a step of extracting second geometric information corresponding to the first geometric information from the deposition track plan and calculating a deviation amount between the first geometric information and the second geometric information;

a step of updating the deposition track plan by changing at least one of a bead height and a bead width in a cross section perpendicular to a bead longitudinal direction of the weld bead defined by the deposition track plan, according to the deviation amount; and a step of changing a welding condition according to an update result of the deposition track plan, wherein a difference between a cross-sectional area of a target shape of the weld bead defined by the deposition track plan and a cross-sectional area of the weld bead obtained from the shape profile in the cross section perpendicular to the longitudinal direction of the weld bead is set as the deviation amount.

(4) An additive manufacturing method of depositing weld beads formed by melting and solidifying a filler metal while moving a welding torch attached to a robot tip shaft, the additive manufacturing method including:

a step of measuring a shape profile of an existing weld bead by a non-contact shape sensor provided on the robot tip shaft integrally with the welding torch, during manufacture of an additively-manufactured object by forming the weld beads, based on a deposition track plan that defines a target position of the welding torch and a shape of the weld beads;

a step of extracting first geometric information of a bead shape from the shape profile and the target position of the welding torch;

a step of extracting second geometric information corresponding to the first geometric information from the deposition track plan and calculating a deviation amount between the first geometric information and the second geometric information;

a step of updating the deposition track plan by changing at least one of a bead height and a bead width in a cross section perpendicular to a bead longitudinal direction of the weld bead defined by the deposition track plan, according to the deviation amount; and a step of changing a welding condition according to an update result of the deposition track plan, wherein a cross-sectional shape approximation curve is obtained by approximating the shape profile in the cross section perpendicular to the longitudinal direction of the weld bead to a curve model by regression calculation, and a difference between a cross-sectional area surrounded by the cross-sectional shape approximation curve and a cross-sectional area of a target shape of the weld bead defined by the deposition track plan is set as the deviation amount.

(5) An additive manufacturing method of depositing weld beads formed by melting and solidifying a filler metal while moving a welding torch attached to a robot tip shaft, the additive manufacturing method including:

a step of measuring a shape profile of an existing weld bead by a non-contact shape sensor provided on the robot tip shaft integrally with the welding torch, during manufacture of an additively-manufactured object by forming the weld beads, based on a deposition track plan that defines a target position of the welding torch and a shape of the weld beads;

a step of extracting first geometric information of a bead shape from the shape profile and the target position of the welding torch;

a step of extracting second geometric information corresponding to the first geometric information from the deposition track plan and calculating a deviation amount between the first geometric information and the second geometric information;

a step of updating the deposition track plan by changing at least one of a bead height and a bead width in a cross section perpendicular to a bead longitudinal direction of the weld bead defined by the deposition track plan, according to the deviation amount; and a step of changing a welding condition according to an update result of the deposition track plan, wherein a cross-sectional shape approximation curve obtained by approximating the shape profile in the cross section perpendicular to the longitudinal direction of the weld bead to a curve model by regression calculation, is set so that a cross-sectional area of a region surrounded by the cross-sectional shape approximation curve and a cross-sectional area of a target shape of the weld bead defined by the deposition track plan are equal, and a difference between a position of a topmost portion of the cross-sectional shape approximation curve and a target formation position of the weld bead is set as the deviation amount.

(6) An additive manufacturing method of depositing weld beads formed by melting and solidifying a filler metal while moving a welding torch attached to a robot tip shaft, the additive manufacturing method including:

a step of measuring a shape profile of an existing weld bead by a non-contact shape sensor provided on the robot tip shaft integrally with the welding torch, during manufacture of an additively-manufactured object by forming the weld beads, based on a deposition track plan that defines a target position of the welding torch and a shape of the weld beads;

a step of extracting first geometric information of a bead shape from the shape profile and the target position of the welding torch;

a step of extracting second geometric information corresponding to the first geometric information from the deposition track plan and calculating a deviation amount between the first geometric information and the second geometric information;

a step of updating the deposition track plan by changing at least one of a bead height and a bead width in a cross section perpendicular to a bead longitudinal direction of the weld bead defined by the deposition track plan, according to the deviation amount; and a step of changing a welding condition according to an update result of the deposition track plan, wherein a cross-sectional shape approximation curve is obtained by approximating the shape profile in the cross section perpendicular to the longitudinal direction of the weld bead to a curve model by regression calculation, and a difference between a height of an optional point on the cross-sectional shape approximation curve and a height of a position corresponding to the optional point on a target shape of the weld bead defined by the deposition track plan is set as the deviation amount.

(7) An additive manufacturing method of depositing weld beads formed by melting and solidifying a filler metal while moving a welding torch attached to a robot tip shaft, the additive manufacturing method including:

a step of measuring a shape profile of an existing weld bead by a non-contact shape sensor provided on the robot tip shaft integrally with the welding torch, during manufacture of an additively-manufactured object by forming the weld beads, based on a deposition track plan that defines a target position of the welding torch and a shape of the weld beads;

a step of extracting first geometric information of a bead shape from the shape profile and the target position of the welding torch;

a step of extracting second geometric information corresponding to the first geometric information from the deposition track plan and calculating a deviation amount between the first geometric information and the second geometric information;

a step of updating the deposition track plan by changing at least one of a bead height and a bead width in a cross section perpendicular to a bead longitudinal direction of the weld bead defined by the deposition track plan, according to the deviation amount; and a step of changing a welding condition according to an update result of the deposition track plan, wherein a cross-sectional shape approximation curve obtained by approximating the shape profile in the cross section perpendicular to the longitudinal direction of the weld bead to a curve model by regression calculation, is set so that a difference between a height of an optional point on the cross-sectional shape approximation curve and a height of a position corresponding to the optional point on a target shape of the weld bead defined by the deposition track plan is small, and a difference between a position of a topmost portion of the cross-sectional shape approximation curve and a target formation position of the weld bead is set as the deviation amount.

Advantageous Effects of Invention

According to the present invention, the target position for the bead formation can be obtained correctly, and the additively-manufactured object can be manufactured with high accuracy.

DESCRIPTION OF EMBODIMENTS

Hereinafter, embodiments of the present invention will be described in detail with reference to the drawings.

Here, a procedure for manufacturing an additively-manufactured object constituted by a plurality of layers of weld beads using an additive manufacturing device that deposits the weld beads formed by melting and solidifying a filler metal will be described.

Figure 1:
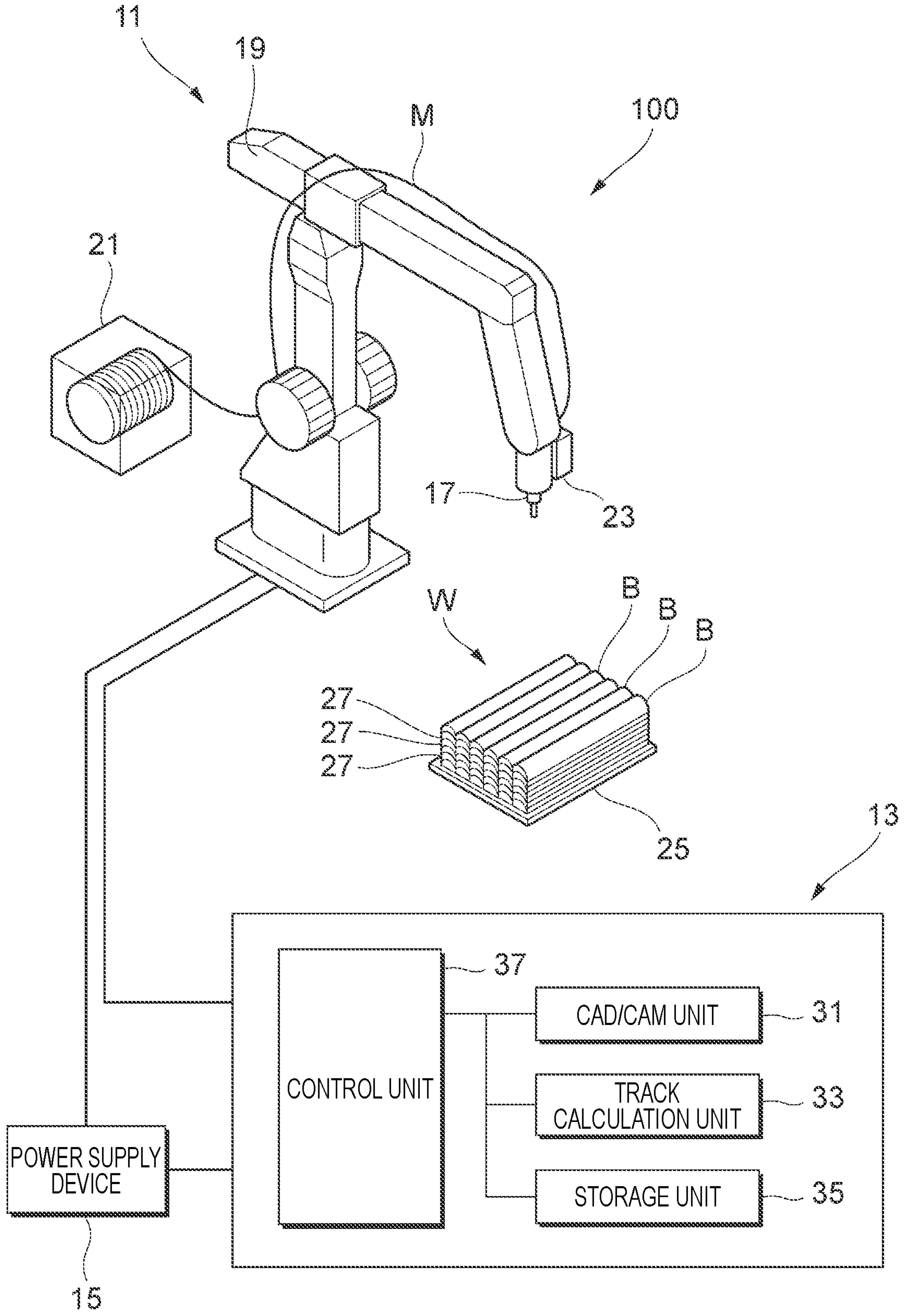
FIG. 1 is a configuration diagram of an additively-manufactured object manufacturing device.

FIG. 1 is a configuration diagram of an additively-manufactured object manufacturing device.

An additive manufacturing device 100 having this configuration includes a manufacturing device 11, a controller 13 that performs integrated control of the manufacturing device 11, and a power supply device 15.

The manufacturing device 11 includes a welding robot 19 including a tip shaft provided with a welding torch 17, and a filler metal supply unit 21 that supplies a filler metal (welding wire) M to the welding torch 17. The manufacturing device 11 forms a weld bead B while the welding robot driving the welding torch 17 to move.

The tip shaft of the welding robot 19 is provided with a non-contact shape sensor that moves integrally with the welding torch 17. As the non-contact shape sensor, a laser shape sensor 23 that detects a three-dimensional shape by a light section method, a pattern projection method, or the like is used here, but the detection method is not limited.

The welding robot 19 is a multi joint robot, and the welding torch 17 attached to the tip shaft of a robot arm is supported so that the filler metal M can be continuously supplied. A position and a posture of the welding torch 17 can be freely set three-dimensionally within a range of degrees of freedom of the robot arm.

The welding torch 17 includes a shield nozzle (not shown), and a shield gas is supplied from the shield nozzle. An arc welding method may be a consumable electrode type such as shielded metal arc welding or carbon dioxide gas arc welding, or a non-consumable electrode type such as TIG welding or plasma arc welding, and is appropriately selected according to the additively-manufactured object to be produced.

For example, in the case of the consumable electrode type, a contact tip is disposed inside the shield nozzle, and the contact tip holds the filler metal M to which a melting current is supplied. The welding torch 17 holds the filler metal M and generates an arc from a tip of the filler metal M in a shield gas atmosphere. The filler metal M is fed from the filler metal supply unit 21 to the welding torch 17 by a feeding mechanism (not shown) attached to the robot arm or the like. When the welding torch 17 is moved and the continuously fed filler metal M is melted and solidified, the linear weld bead B, which is a melted and solidified body of the filler metal M, is formed on a base portion 25.

The base portion 25 is made of a metal plate such as a steel plate, and is basically larger than a bottom surface (lowermost layer surface) of an additively-manufactured object W. Note that the base portion 25 is not limited to have a plate-like shape, and may be a block-like, bar-like, columnar-like, or other shape base.

As the filler metal M, any commercially available welding wire can be used. For example, a wire specified by solid wires for MAG and MIG welding of mild steel, high strength steel and low temperature service steel (JISZ 3312), flux cored wires for arc welding of mild steel, high strength steel and low temperature service steel (JISZ 3313), or the like can be used.

The controller 13 includes a CAD/CAM unit 31, a track calculation unit 33, a storage unit 35, and a control unit 37 connected to the CAD/CAM unit 31, the track calculation unit 33, and the storage unit 35.

The CAD/CAM unit 31 receives shape data (CAD data and the like) of the additively-manufactured object to be produced, and creates a deposition track plan indicating a procedure for manufacturing the additively-manufactured object in cooperation with the track calculation unit 33. This deposition track plan is analytically obtained based on various conditions such as shape, material, and heat input from the input shape data and based on an appropriate algorithm so that deposition can be efficiently performed.

In creating the deposition track plan, first, the shape data is divided into a plurality of layers to generate layer shape data indicating a shape of each layer. Then, a movement track and welding conditions of the welding torch 17 are determined according to the generated layer shape data, and a driving program for the welding robot 19 and the power supply device 15 for forming the weld bead B is generated. This driving program implements operations corresponding to the deposition track plan. Various data such as the driving program and the welding conditions are stored in the storage unit 35.

The control unit 37 drives the welding robot 19, the power supply device 15, and the like by executing the driving program stored in the storage unit 35, thereby forming the weld bead B. That is, the control unit 37 drives the welding robot 19 to move the welding torch 17 along the set track of the welding torch 17, and forms the weld bead B by melting the filler metal M protruding from a tip of the welding torch 17 with an arc according to the set welding conditions. Then, a plurality of weld beads B are formed on the base portion 25 to be adjacent to each other to form a weld bead layer 27, and deposition of a next layer of the welding bead layer 27 on this welding bead layer 27 is repeated. In this way, the additively-manufactured object W having a desired shape is manufactured.

When the control unit 37 moves the welding torch 17 for bead formation, the laser shape sensor 23 measures a shape of the existing weld bead B that is already formed. The measurement by the laser shape sensor 23 may be performed at times other than the welding.

<Correction of Deposition Track Plan and Welding Conditions>

Here, in the additive manufacturing device 100 having this configuration, the track calculation unit 33 obtains a target position of the welding torch 17 for forming the weld bead to be formed next (hereinafter referred to as a torch target position) and welding conditions according to the created deposition track plan and the welding conditions, and a shape measurement result of the existing weld bead during deposition, and changes the deposition track plan and the welding conditions as necessary.

Figure 2:
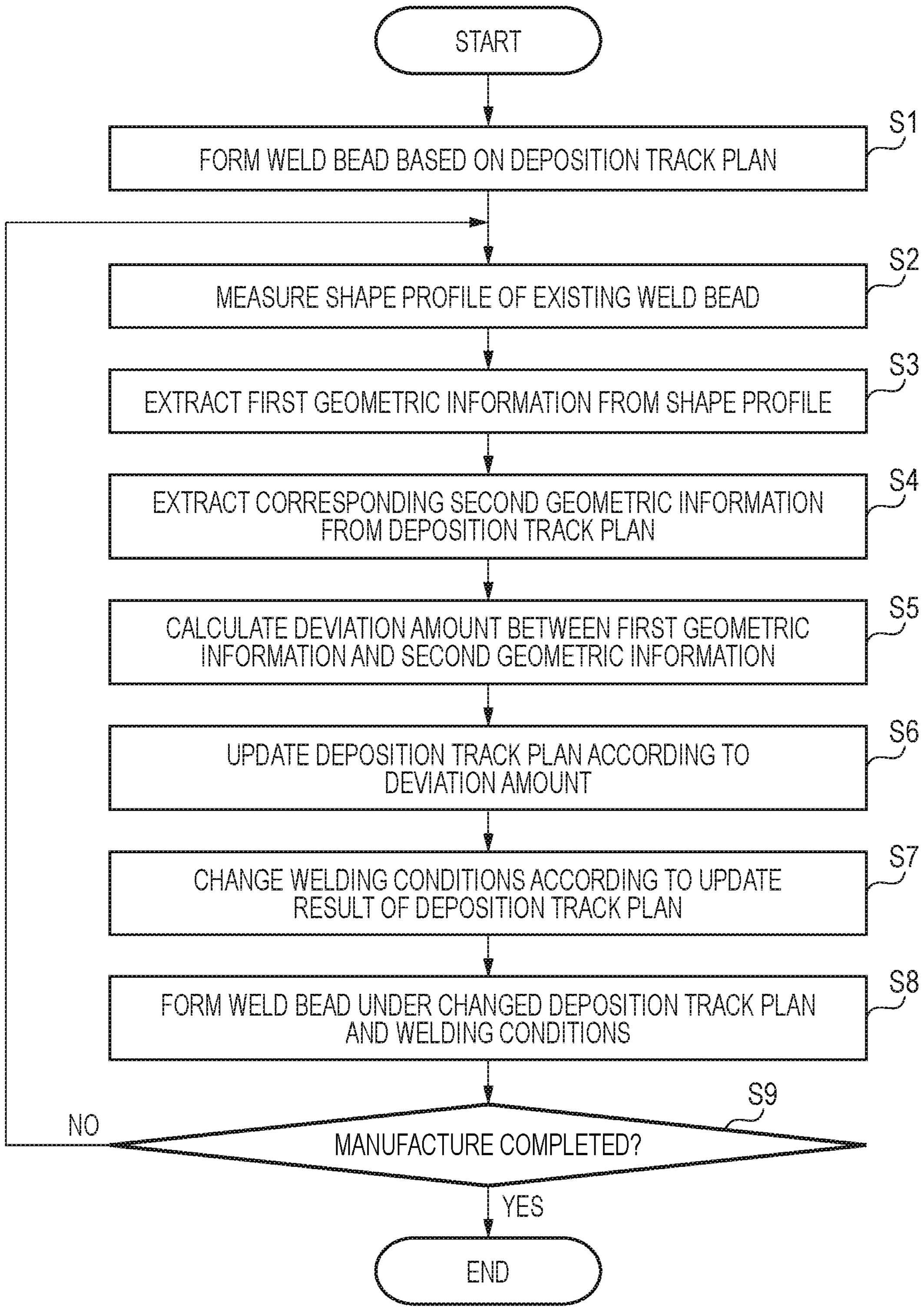
FIG. 2 is a flow chart showing a procedure for determining a torch target position and welding conditions for bead formation from a deposition track plan, welding conditions, and a shape measurement result of a weld bead.

FIG. 2 is a flow chart showing a procedure for determining the torch target position and the welding conditions for the bead formation from the deposition track plan, the welding conditions, and the shape measurement result of the weld bead.

First, the weld bead is formed according to the deposition track plan created based on the inputted shape data (S1).

Figure 3:
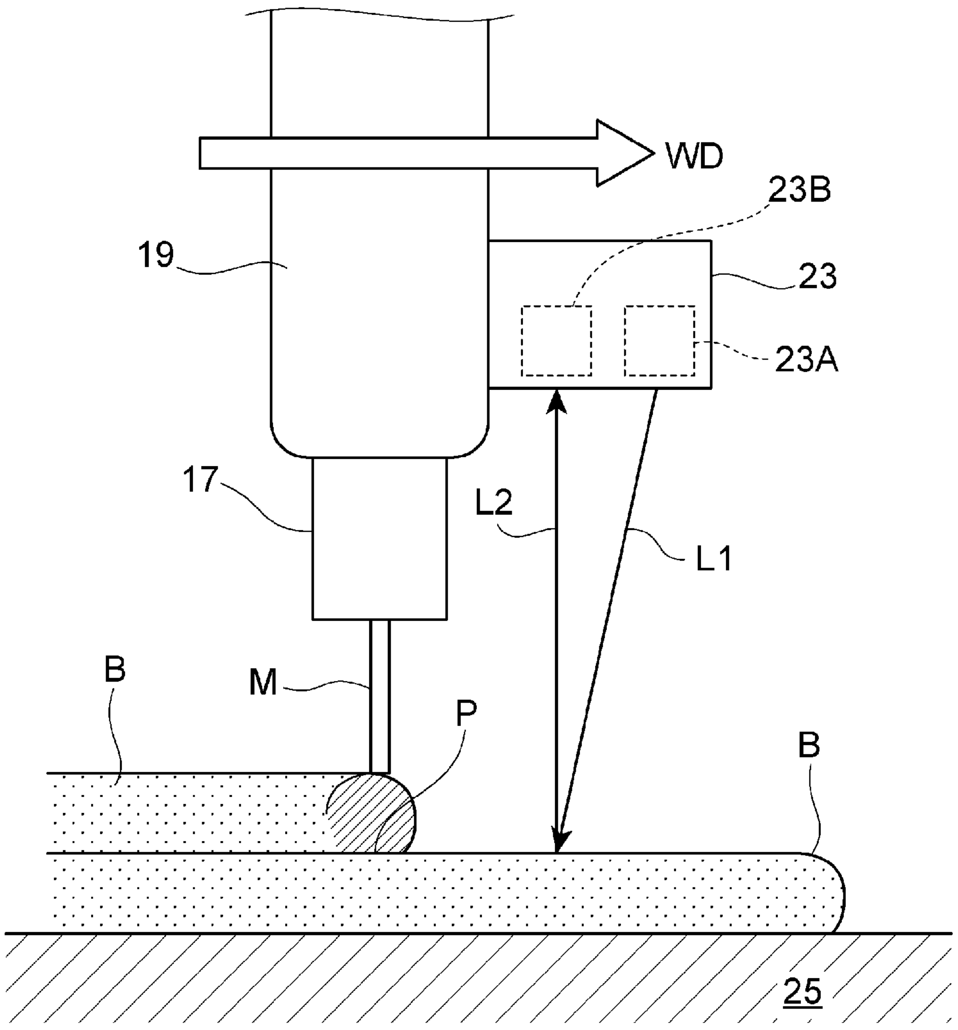
FIG. 3 is a schematic diagram showing a state of forming a weld bead.

FIG. 3 is a schematic diagram showing a state of forming the weld bead B.

The welding robot 19 is driven to form the weld bead B while moving the welding torch 17. At this time, the laser shape sensor 23 provided integrally with the welding torch 17 at the tip shaft of the welding robot 19 measures the shape of the existing weld bead B at a position downstream of a torch target position P in a welding direction WD.

The laser shape sensor 23 includes a laser emitting unit 23A and a detection sensor 23B. For example, when the measurement is performed by a light section method, a slit light L1 is emitted from the laser emitting unit 23A, and a reflected light L2 from the existing weld bead B is detected by the detection sensor 23B, which is an image sensor. A two-dimensional image detected by the detection sensor 23B includes a pattern corresponding to a height of the weld bead, and the shape of the weld bead is obtained from the pattern. Since the specific shape detection method is publicly known, description thereof is omitted here.

Figure 4:
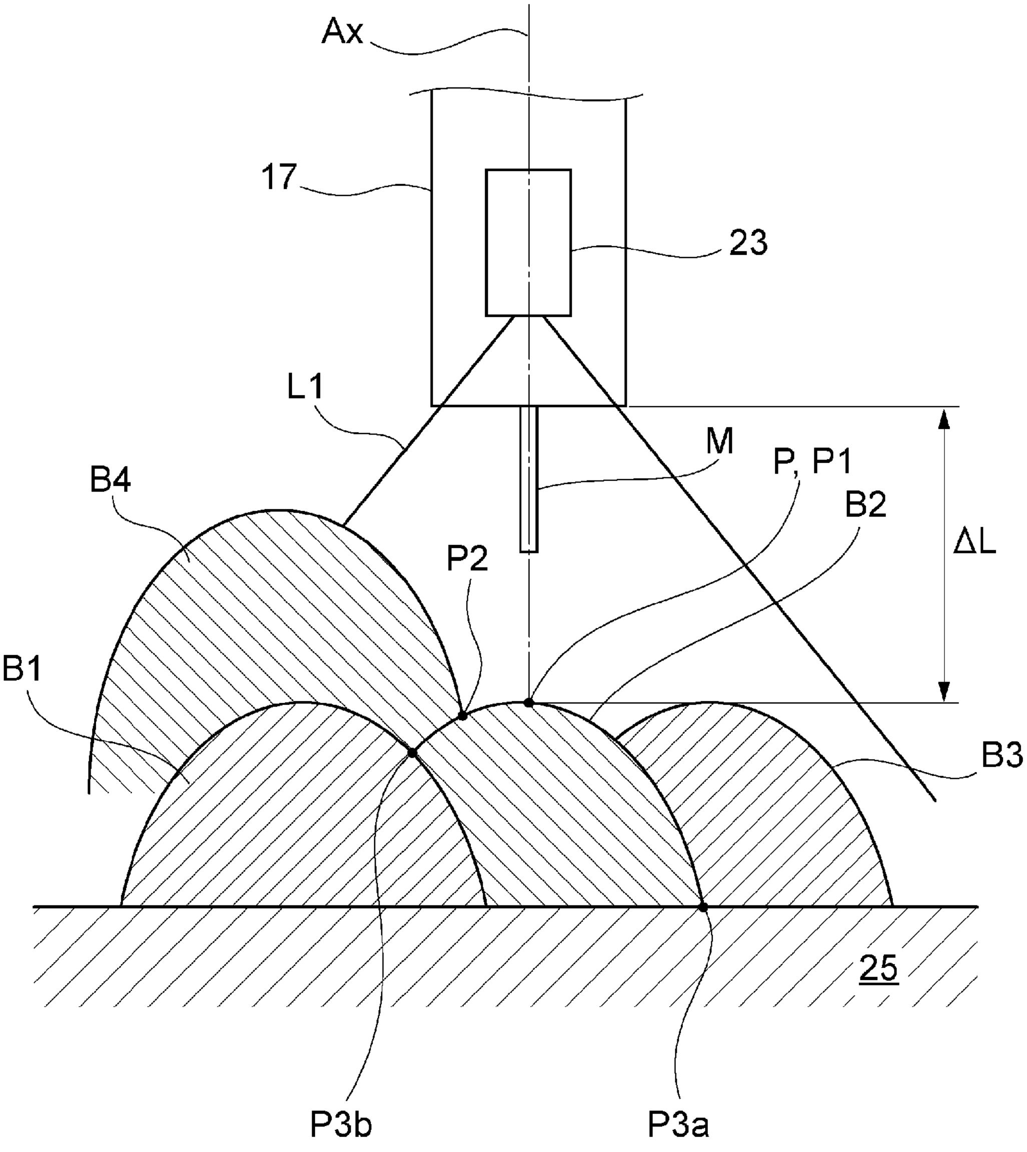
FIG. 4 is a schematic explanatory diagram showing a cross-sectional shape of the weld bead and a position of a torch when a welding position is viewed from a downstream side in a welding direction.

FIG. 4 is a schematic explanatory diagram showing a cross-sectional shape of the weld bead B and a position of the welding torch 17 when a welding position is viewed from a downstream side in the welding direction.

In this case, lower-layer weld beads B1, B2, and B3 and a weld bead B4 formed above the weld bead B1 are provided around the torch target position P where the weld bead is formed.

The laser shape sensor 23 emits the slit light L1 and detects reflected light from the weld beads B1 to B4 to obtain a shape of each weld bead around a tip of the torch. In FIG. 4, from the measured shape of each weld bead, shape information including an apex P1 of the weld bead B2 located directly below an axis Ax of the welding torch 17, and a narrow point P2 connected to a surface of the weld bead B4 disposed on a side of the welding torch 17 and a surface of the weld bead B2, is obtained.

Figure 5:
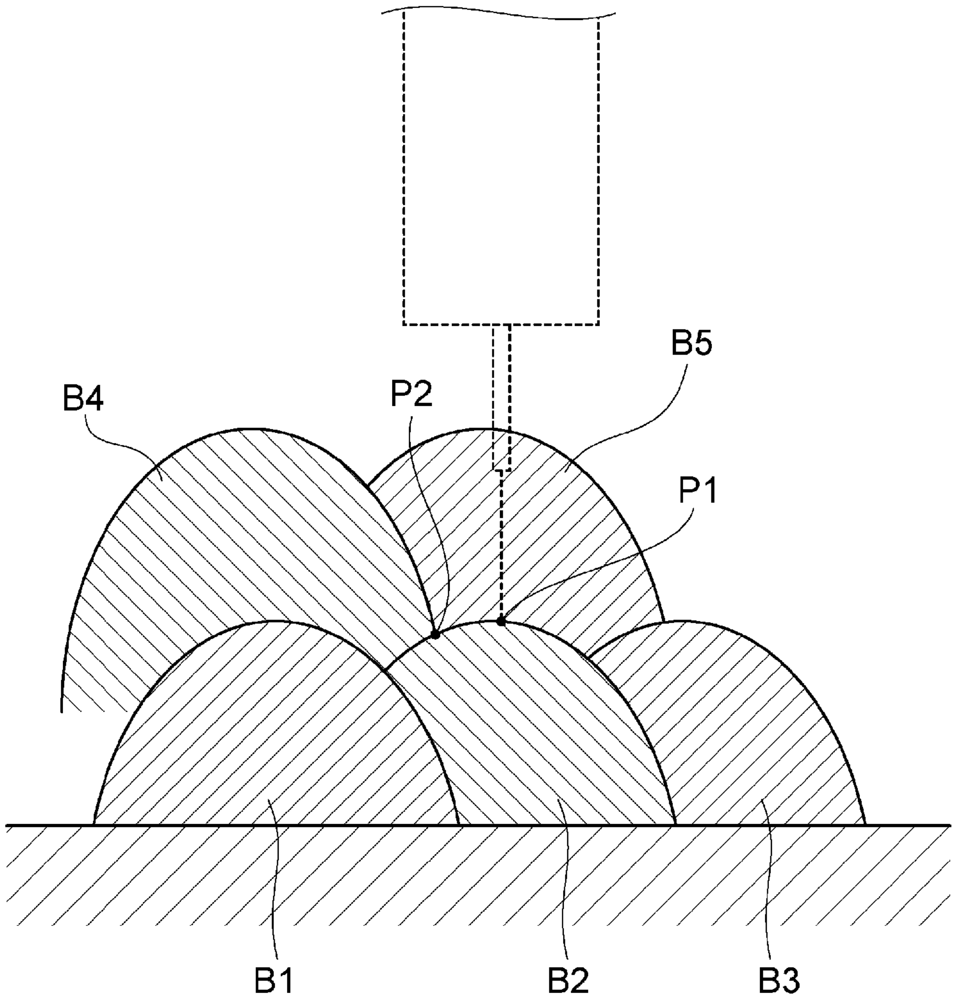
FIG. 5 is a schematic explanatory diagram showing a state of forming a new weld bead along the existing weld bead shown in FIG. 4.

FIG. 5 is a schematic explanatory diagram showing a state of forming a new weld bead along the existing weld beads shown in FIG. 4.

According to the shapes of the existing weld beads B1 to B4 around the tip of the welding torch 17 shown in FIG. 4, a torch target position of a weld bead B5 to be formed next shown in FIG. 5, welding conditions during the bead formation, and the like are determined. If there is a difference between setting contents such as the determined torch target position and the welding conditions and setting contents such as the torch movement track in the initial deposition track plan and the welding conditions, the deposition track plan and the welding conditions are changed.

Here, a change procedure for the deposition track plan and the welding conditions described above will be described in detail.

<Basic Change Procedure>

Figure 6:
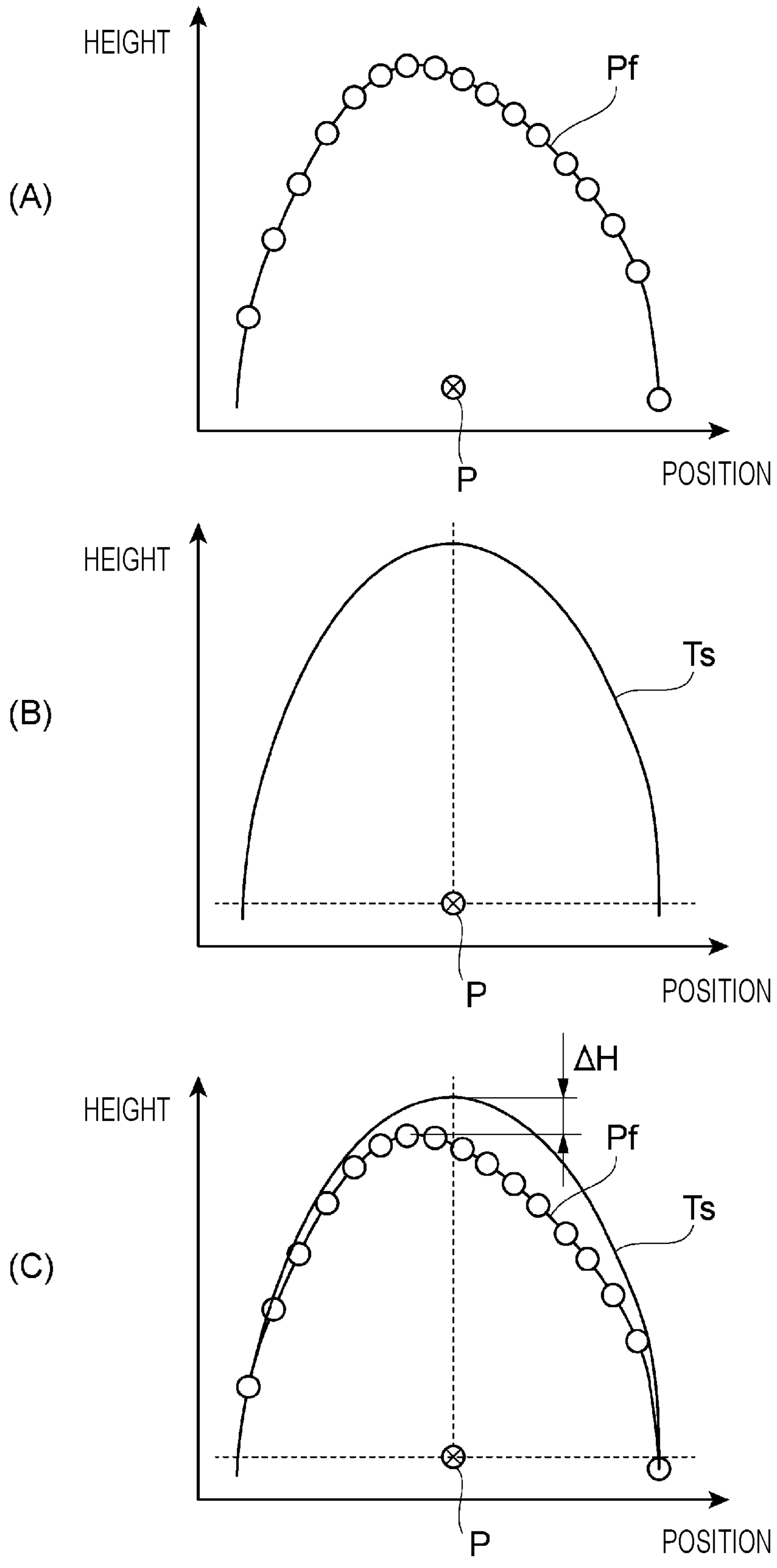
FIG. 6 is an explanatory diagram showing a basic change procedure in stages (A) to (C) for changing the deposition track plan and the welding conditions for forming the new weld bead according to a shape of the existing weld bead.

FIG. 6 is an explanatory diagram showing a basic change procedure in stages (A) to (C) for changing the deposition track plan and the welding conditions for forming the new weld bead according to the shape of the existing weld bead. Note that (A) to (C) of FIG. 6 show the shape in a cross section perpendicular to a longitudinal direction of the weld bead.

First, as shown in (A) of FIG. 6, the laser shape sensor 23 measures a shape profile Pf of the existing weld bead (S2). Here, for simplification, a measurement example of one weld bead is shown. In addition to a line connecting a plurality of measurement points, the shape profile Pf may be a straight line or a curved line interpolated between the measurement points, or the like.

With reference to the deposition track plan, the torch target position P corresponding to the measured weld bead is extracted. First geometric information of the bead shape is extracted from the measured shape profile Pf and information on the extracted torch target position P (S3). The first geometric information means information including the shape profile Pf and the torch target position P, which are expressed in the same coordinate system by coordinate transformation of the shape profile Pf of the weld bead expressed in a sensor coordinate system by the laser shape sensor 23, and the torch target position P expressed in a robot coordinate system of the welding robot 19 (see FIG. 1).

Here, in order to make the torch target position P correspond to the shape profile Pf, the following is performed. First, a welding position is obtained in consideration of inclination (posture) of the welding torch 17 at a torch tip position on the robot coordinate system of the welding robot. That is, a set value of a distance ΔL (see FIG. 4) from the tip of the torch to the existing weld bead directly below is offset to the torch tip position. The offset position is the welding position of the welding torch 17, and this position is defined as the torch target position P. Then, the torch target position P in the robot coordinate system is coordinate-transformed into the sensor coordinate system. In this way, the shape profile Pf of the sensor coordinate system and the torch target position P are associated with each other in the same coordinate system.

Next, second geometric information corresponding to the extracted first geometric information is extracted (S4). Here, the second geometric information is information on a target shape of the weld bead and the torch target position in the deposition track plan used when forming the weld bead whose bead shape is measured as described above.

(B) of FIG. 6 shows a target shape Ts of the weld bead and the torch target position P defined by the deposition track plan when forming the weld bead having the shape profile Pf shown in (A) of FIG. 6.

Then, the first geometric information and the second geometric information are compared with each other to calculate a deviation amount between the two (S5). That is, a deviation amount between the measured shape of the weld bead and the target shape is obtained.

(C) of FIG. 6 shows a deviation amount ΔH in height between the shape profile Pf shown in (A) of FIG. 6 and the target shape Ts shown in (B) of FIG. 6. The deviation amount ΔH is a height difference between an apex of the shape profile Pf and an apex of the target shape Ts, and the apex of the shape profile Pf is determined using a height of a measurement point near the apex. Note that the shape profile Pf and the target shape Ts here are arranged so that each torch target position P is at the same position.

The deposition track plan is updated by changing at least one of a bead height Bh and a bead width Bw (see FIG. 7) in the target shape Ts of the weld bead B defined by the deposition track plan so that the deviation amount ΔH in height is reduced (S6). Here, the deposition track plan may be updated by changing various parameters such as the torch target position and a bead cross-sectional area, in addition to changing the bead height Bh and the bead width Bw.

The welding conditions are changed according to an update result of the deposition track plan (S7). Examples of the welding conditions include a position of the welding torch, a posture of the welding torch, a welding speed, a welding voltage, a welding current, and a feeding speed of the filler metal. At least one of these conditions is changed, or a combination of any two or more is changed.

Then, a weld bead is formed under the changed deposition track plan and welding conditions (S8). The above steps are repeated until the additively-manufactured object is completed (S9).

It is not always necessary to recognize the tip position of the welding torch, the position of the weld bead, and the shape of the existing weld bead. Recognition of the above may be necessary only at a required position, or only one of the above may be preferentially recognized. For example, when manufacturing an additively-manufactured object including weld beads that form a frame and weld beads that fill an inside of the frame, in manufacturing the frame where comparatively thin welding beads are deposited, it is necessary to precisely adjust a position of each bead, so the position and shape described above are always recognized. On the other hand, in manufacturing to fill the inside of the frame, since it is necessary to fill the inside of the frame without gaps, recognition of the cross-sectional area of the weld bead is prioritized over adjusting the torch position.

Figure 7:
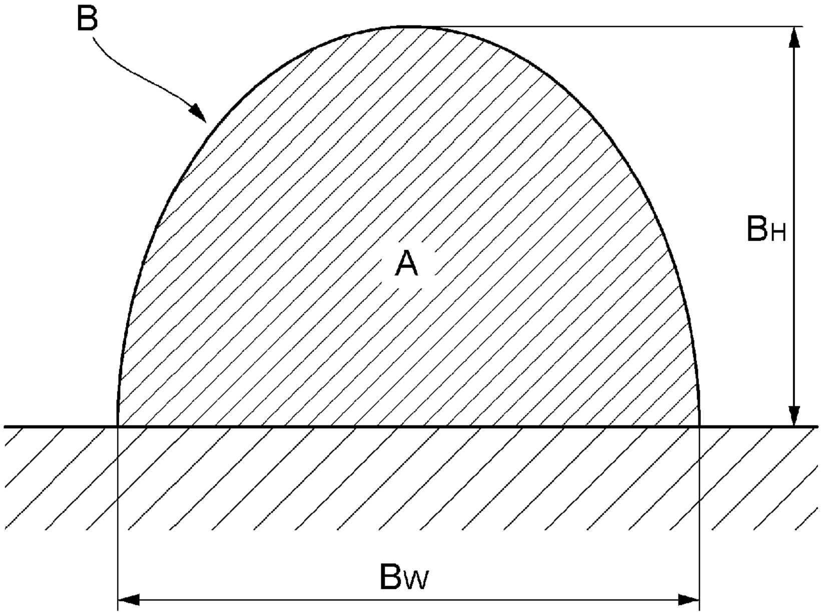
FIG. 7 is a cross-sectional diagram showing the shape of the weld bead.

FIG. 7 is a cross-sectional diagram showing the shape of the weld bead.

Preferably, the first geometric information and the second geometric information described above include at least one of the bead height Bh, the bead width Bw, a bead cross-sectional area A in the cross section perpendicular to the bead longitudinal direction, a geometric feature point near the torch target position, and a cross-sectional shape approximation curve indicating a bead outer shape of the weld bead B, whose details will be described later.

Here, the geometric feature point is a feature point extracted from the existing weld bead disposed around the welding torch 17, as shown in FIG. 4, and includes the apex P1 of a convex shape of the existing weld bead B2 and the narrow point P2 formed by recessing a bead outer surface inward between the weld bead B2 and another weld bead B4 adjacent to the weld bead B2. Before formation of the weld bead B3, between a pair of points P3*a* and P3*b* at widthwise end portions of the weld bead B2, the geometric feature point also includes the point P3*a* that intersects with a lower layer surface (here, the base portion 25) on which the welding bead B2 is formed.

A cross-sectional area of a weld bead for the existing weld bead can also be determined by the welding conditions during the bead formation. The bead cross-sectional area A is equal to a cross-sectional area of a newly introduced metal material for the bead formation. For example, when the weld bead is approximated by an elliptical model, the bead cross-sectional area A changes according to a short axis of the elliptical model and a height from a base (lower layer). Note that the cross-sectional area referred to here means a volume per unit length of the weld bead, and is represented by the following Formula (1).

$$A = dw^2 Fw\pi/4F \quad (1)$$

dw: diameter [mm] of filler metal

Fw: deeding speed [mm/min] of filler metal

F: torch feed rate [mm/min]

A cross-sectional area of the weld bead to be formed next may be obtained by, for example, using an arc centered at the torch target position P as an outline of the weld bead and using an area inside the arc as the cross-sectional area of the weld bead. However, a method for calculating the cross-sectional area is not limited to this.

According to this additive manufacturing method, the deposition track plan is updated according to the difference in bead height between the deposition track plan and an actual weld bead formation result, and the welding conditions are changed accordingly, so that it is possible to form the next weld bead with high accuracy. Since the weld bead is formed according to the deposition track plan based on feedback of the actual bead formation result, it is possible to stably implementing manufacturing with an accuracy of an order of 0.1 mm, for example.

Next, other change procedures for the deposition track plan and the welding conditions based on the basic change procedure described above will be sequentially described.

<First Change Procedure>

Figure 8:
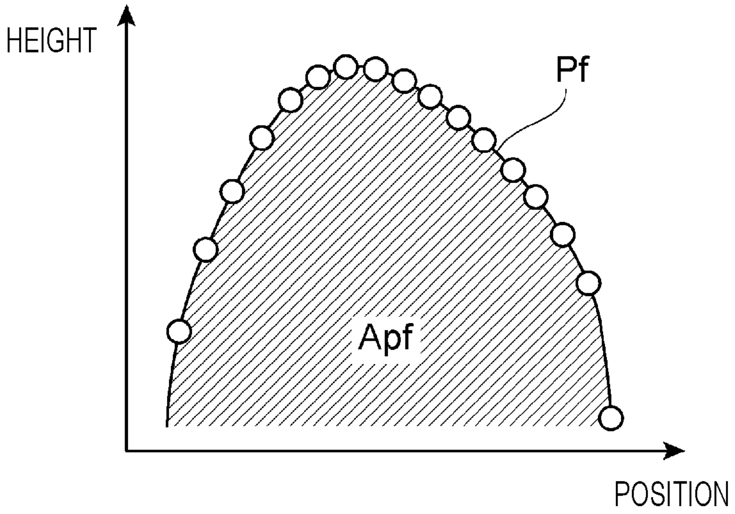
FIG. 8 is an explanatory diagram showing a first change procedure in stages (A) to (C) for changing the deposition track plan and the welding conditions for forming the new weld bead according to the shape of the existing weld bead.
Figure 8:
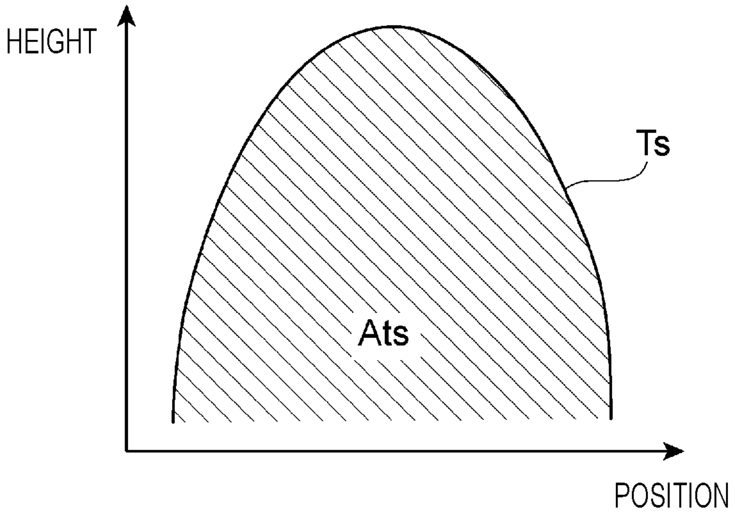
Figure 8:
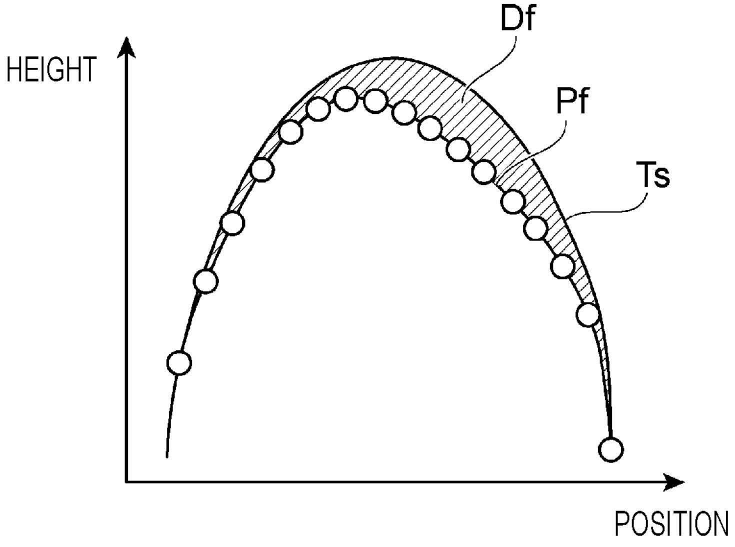

FIG. 8 is an explanatory diagram showing a first change procedure in stages (A) to (C) for changing the deposition track plan and the welding conditions for forming the new weld bead according to the shape of the existing weld bead.

A cross-sectional area of the shape profile Pf in the cross section perpendicular to the longitudinal direction of the weld bead shown in (A) of FIG. 8 is set as Apf, and a cross-sectional area of the target shape Ts of the weld bead defined by the deposition track plan shown in (B) of FIG. 8 is set as Ats.

In this change procedure, as shown in (C) of FIG. 8, a difference Df between the cross-sectional area Apf of the shape profile Pf and the cross-sectional area Ats of the target shape Ts is used as a deviation amount, and the deposition track plan is changed so that this deviation amount is reduced. Then, according to the updated deposition track plan, the welding conditions are changed as necessary.

According to this procedure, since an area difference between the shape profile Pf and the target shape Ts is reduced, even if the shape profile Pf has a locally large shape difference from the target shape Ts, it is possible to appropriately reduce the deviation amount without being greatly affected by this local shape difference.

<Second Change Procedure>

Figure 9:
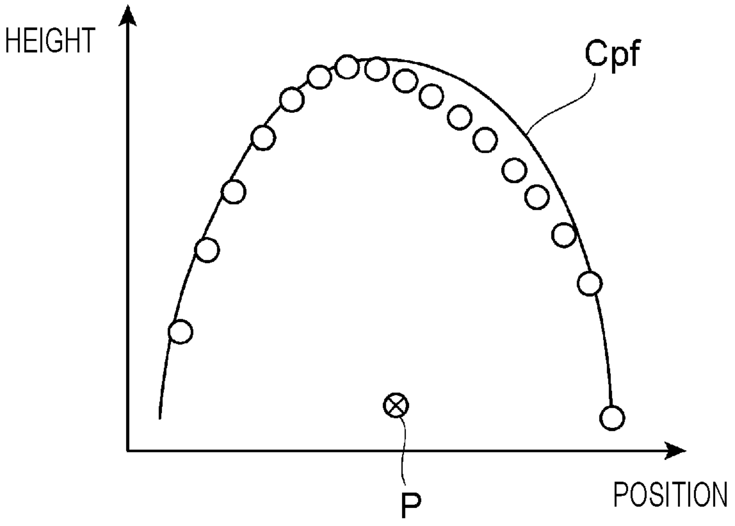
FIG. 9 is an explanatory diagram showing a second change procedure in stages (A) to (C) for changing the deposition track plan and the welding conditions for forming the new weld bead according to the shape of the existing weld bead.
Figure 9:
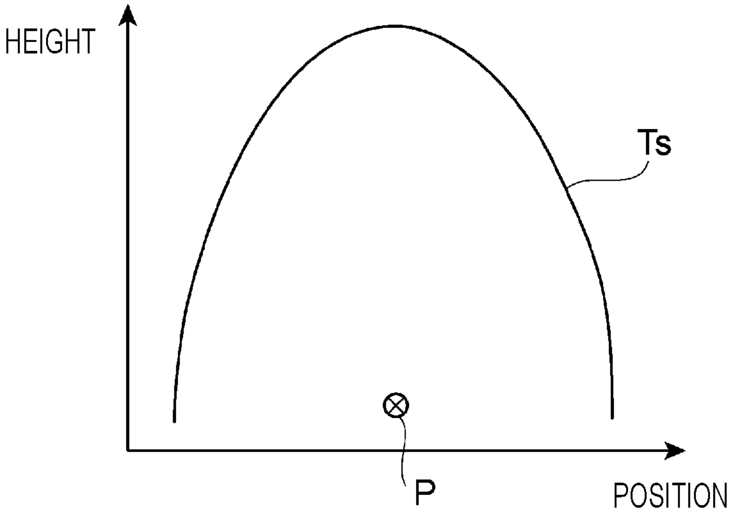
Figure 9:
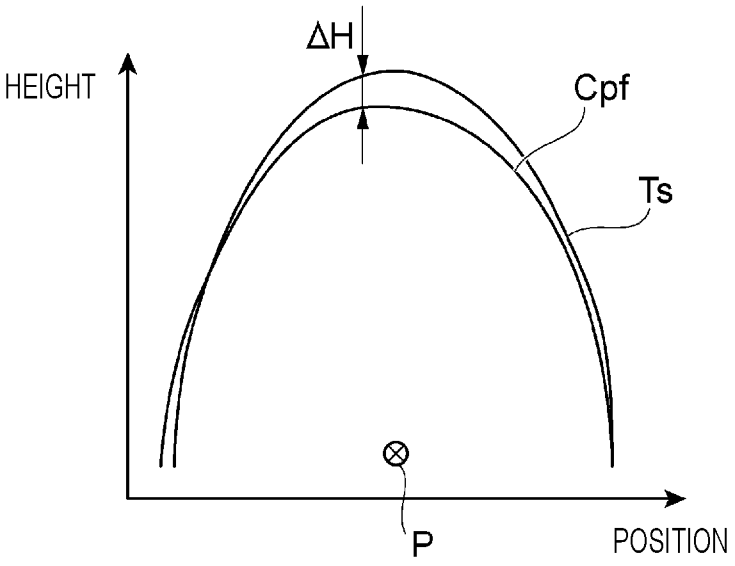

FIG. 9 is an explanatory diagram showing a second change procedure in stages (A) to (C) for changing the deposition track plan and the welding conditions for forming the new weld bead according to the shape of the existing weld bead.

In this change procedure, as shown in (A) of FIG. 9, a cross-sectional shape approximation curve Cpf is obtained by approximating the shape profile to a curve model by regression calculation. Any curve such as a parabola, a cubic or higher function, and a spline curve can be used as the curve model. For example, a curve model of $Z=aY^2+bY+c$ (a, b, and c are coefficients) is used to perform fitting with the measured shape profile Pf (Yj, Zj). For fitting, a publicly known method such as a method of least squares or a method of steepest descent can be adopted.

Then, the cross-sectional shape approximation curve Cpf and the target shape Ts shown in (B) of FIG. 9 are superimposed with each other to make the torch target positions P match as shown in (C) of FIG. 9, and then a distribution of the deviation amount $\Delta H$ in height between the cross-sectional shape approximation curve and the target shape is obtained. The deposition track plan is changed so that this deviation amount $\Delta H$ is reduced. Then, according to the updated deposition track plan, the welding conditions are changed as necessary.

According to this procedure, since the shape profile is approximated to the curve model, the bead shape can be recognized more precisely, and a bead center position, the bead height, and the like of the shape profile can be obtained more accurately. Therefore, the weld bead to be formed next can be formed with higher accuracy.

<Third Change Procedure>

Figure 10:
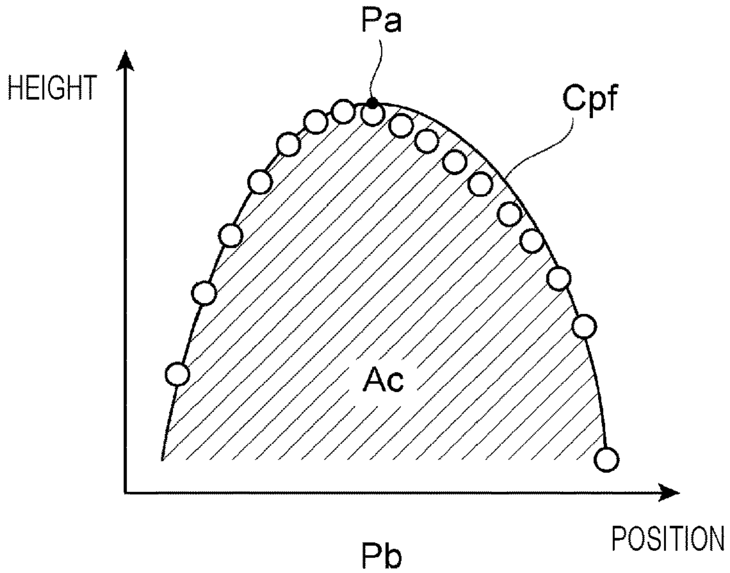
FIG. 10 is an explanatory diagram showing a third change procedure in stages (A) to (C) for changing the deposition track plan and the welding conditions for forming the new weld bead according to the shape of the existing weld bead.
Figure 10:
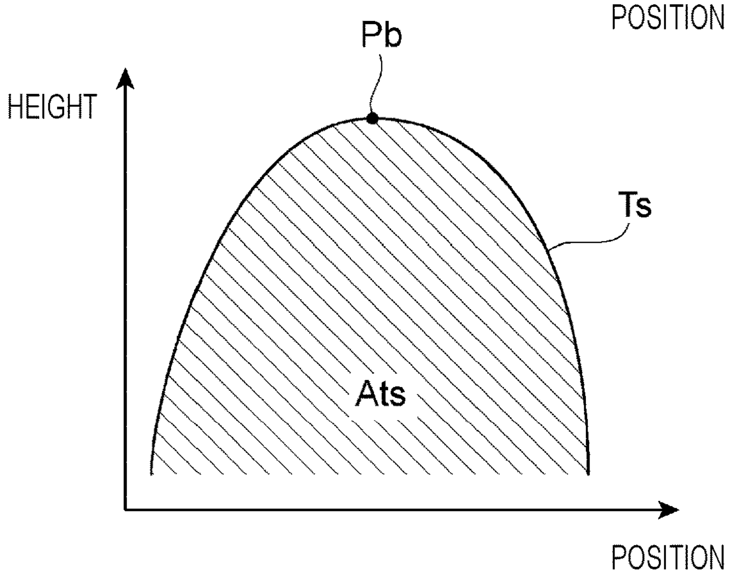
Figure 10:
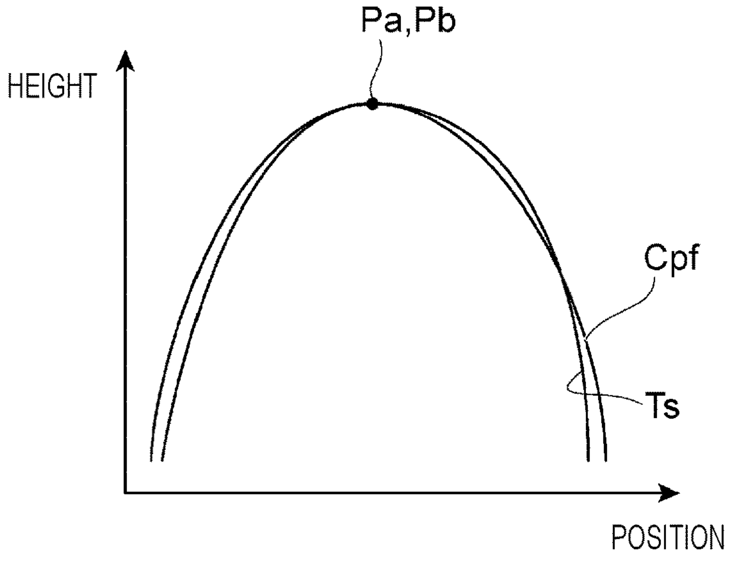

FIG. 10 is an explanatory diagram showing a third change procedure in stages (A) to (C) for changing the deposition track plan and the welding conditions for forming the new weld bead according to the shape of the existing weld bead.

In this change procedure, as shown in (A) of FIG. 10, the cross-sectional shape approximation curve Cpf obtained by approximating the shape profile to the curve model by regression calculation is set so that a cross-sectional area Ac of a region surrounded by the cross-sectional shape approximation curve Cpf becomes equal to the cross-sectional area Ats of the target shape Ts shown in (B) of FIG. 10. For this calculation, for example, a constrained least squares method can be adopted. This constrained least squares method is a method of performing approximation processing under a constraint that the cross-sectional area Ac formed by the cross-sectional shape approximation curve Cpf as a model curve and the cross-sectional area Ats predefined by the deposition track plan match with each other, when minimizing an objective function representing an error amount.

As shown in (C) of FIG. 10, the deposition track plan is changed so that a topmost portion Pa of the cross-sectional shape approximation curve Cpf in which the cross-sectional area Ac is equal to the cross-sectional area Ats coincides with the target formation position of the weld bead, which is a topmost portion Pb of the target shape Ts. In other words, the target formation position of the weld bead is corrected so that the topmost portion Pa of the cross-sectional shape approximation curve corresponding to the formed weld bead coincides with the topmost portion Pb of the target shape Ts. Then, according to the updated deposition track plan, the welding conditions are changed as necessary.

According to this procedure, the weld bead to be formed next can be formed with high accuracy by a simple process of matching the topmost portion Pa of the cross-sectional shape approximation curve with the topmost portion Pb of the target shape Ts.

<Fourth Change Procedure>

Figure 11:
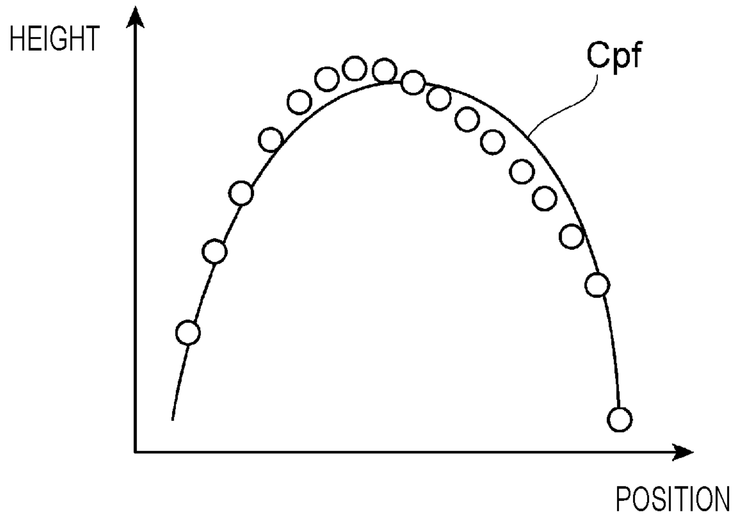
FIG. 11 is an explanatory diagram showing a fourth change procedure in stages (A) and (B) for changing the deposition track plan and the welding conditions for forming the new weld bead according to the shape of the existing weld bead.
Figure 11:
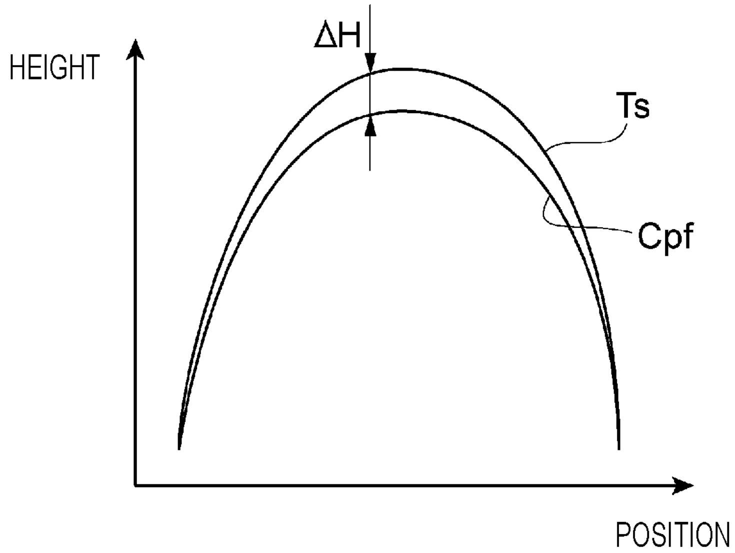

FIG. 11 is an explanatory diagram showing a fourth change procedure in stages (A) and (B) for changing the deposition track plan and the welding conditions for forming the new weld bead according to the shape of the existing weld bead.

In this change procedure, as shown in (A) of FIG. 11, the cross-sectional shape approximation curve Cpf is obtained by approximating the shape profile to the curve model by regression calculation.

Next, as shown in (B) of FIG. 11, the target formation position of the weld bead is corrected so that the deviation amount ΔH, which is the difference between a height of an optional point on the cross-sectional shape approximation curve Cpf over the entire cross-sectional shape approximation curve Cpf and a height of an outline of the target shape Ts corresponding to the optional point, is reduced. Then, according to the updated deposition track plan, the welding conditions are changed as necessary.

According to this procedure, since the deviation amount ΔH is determined using the cross-sectional shape approximate curve Cpf, the correction can be performed more stably and accurately than when the deviation amount ΔH is determined using the shape profile shown in FIG. 6, and the weld bead can be formed with higher accuracy.

<Fifth Change Procedure>

Figure 12:
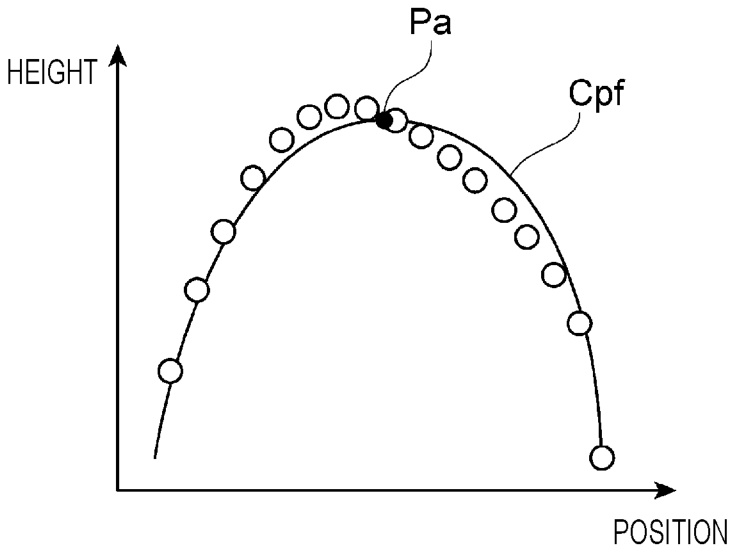
FIG. 12 is an explanatory diagram showing a fifth change procedure in stages (A) and (B) for changing the deposition track plan and the welding conditions for forming the new weld bead according to the shape of the existing weld bead.
Figure 12:
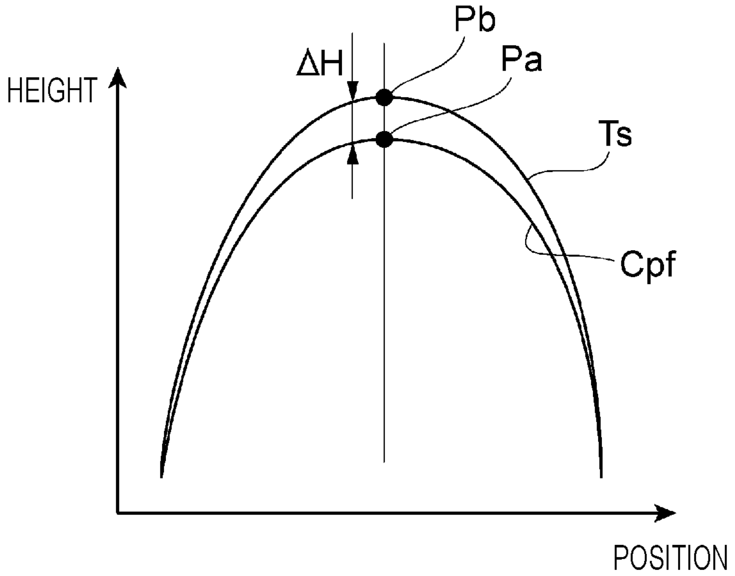

FIG. 12 is an explanatory diagram showing a fifth change procedure in stages (A) and (B) for changing the deposition track plan and the welding conditions for forming the new weld bead according to the shape of the existing weld bead.

In this change procedure, as shown in (A) of FIG. 12, the cross-sectional shape approximation curve Cpf obtained by approximating the shape profile to the curve model by regression calculation is changed so that the deviation amount ΔH, which is the difference between the height of an optional point on the cross-sectional shape approximation curve Cpf and the height of the outline of the target shape Ts corresponding to the optional point is reduced as shown in (B) of FIG. 12.

The deposition track plan is changed so that the position of the cross-sectional shape approximation curve Cpf matches the target formation position of the weld bead, which is the target shape Ts. That is, the deposition track plan is changed so as to match the topmost portion Pa of the cross-sectional shape approximation curve corresponding to the formed weld bead with the topmost portion Pb of the target shape Ts. Then, according to the updated deposition track plan, the welding conditions are changed as necessary.

According to this procedure, the deviation amount ΔH in the bead height is reduced, and the position of the cross-sectional shape approximation curve Cpf with the reduced deviation amount ΔH in the bead width direction is matched with the target formation position, so that the weld bead to be formed next can be formed with high accuracy.

<Weld Bead with High Accuracy>

Next, a method for forming the weld bead with higher accuracy will be described.

In the embodiments described above, the weld bead is formed on the flat base portion, but here, a case where the weld bead is formed on a circumferential surface of the base portion will be described.

Figure 13:
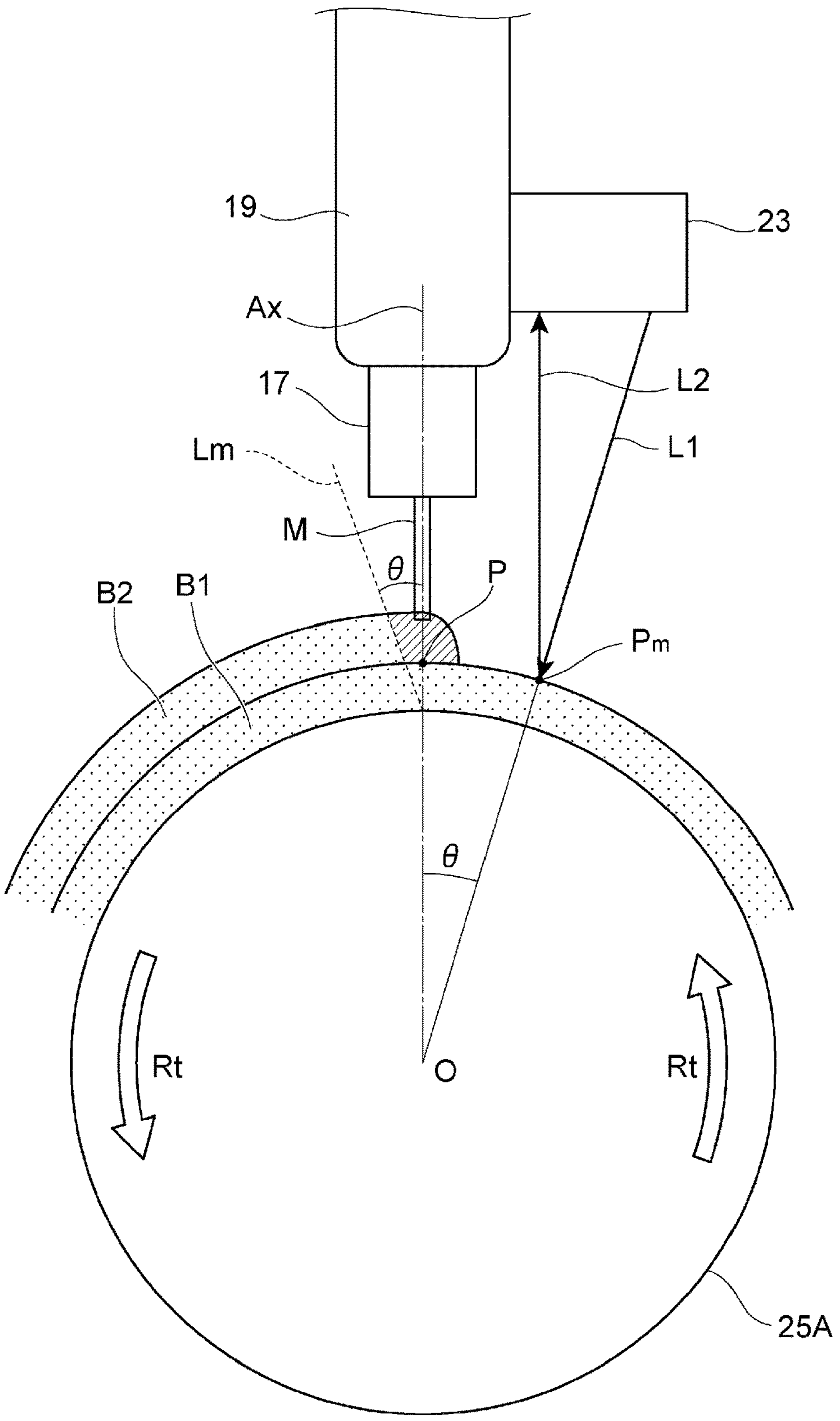
FIG. 13 is an explanatory diagram showing a state of a welding torch provided on a welding robot forming a lower-layer weld bead and an upper-layer weld bead, and a laser shape sensor measuring a bead shape.

FIG. 13 is an explanatory diagram showing a state of the welding torch 17 provided on the welding robot 19 forming the lower-layer weld bead B1 and the upper-layer weld bead B2, and the laser shape sensor 23 measuring the bead shape.

A cylindrical base portion 25A is rotationally driven in a direction Rt shown in FIG. 13 about a central axis O, and the weld bead B is formed by the welding torch 17 on a circumferential surface of an outer periphery of the base portion 25A. The laser shape sensor 23 attached to the welding robot 19 is disposed on an upstream side in a rotation direction of the base portion 25A (the downstream side in the welding direction) to measure the shape of the existing weld bead B1.

The laser shape sensor 23 measures the shape of the weld bead B1 from a two-dimensional image obtained by detecting the reflected light L2. The shape is a shape of a bead cross section parallel to the reflected light L2 at a measurement point Pm. The reflected light L2 is parallel to an axis (torch axis) Ax of the welding torch 17. A central angle of an arc connecting the torch target position P on the base portion 25A shown in FIG. 13 and the measurement point Pm is set as θ.

As the weld bead B2 is formed while rotating the base portion 25A, the weld bead B1 at the measurement point Pm reaches the torch target position P. In this case, the shape of the weld bead B1 measured at the measurement point Pm is not the shape in the cross section including the torch axis Ax, but a shape in a cross section including a straight line Lm inclined rearward in the welding direction by an angle θ from the torch axis Ax.

Therefore, the measured shape of the weld bead B1 is projected and transformed so as to be the shape in the cross section including the torch axis Ax at the torch target position P. Since the projective transformation is a known transformation process for geometrically inclining the angle θ, description of the transformation process is omitted.

Accordingly, the shape of the weld bead measured at the measurement point Pm is converted into a cross-sectional shape corresponding to the position of the torch axis Ax at the torch target position P. As a result, it is possible to change the welding track plan accurately, and to form the weld bead with higher accuracy.

Figure 14:
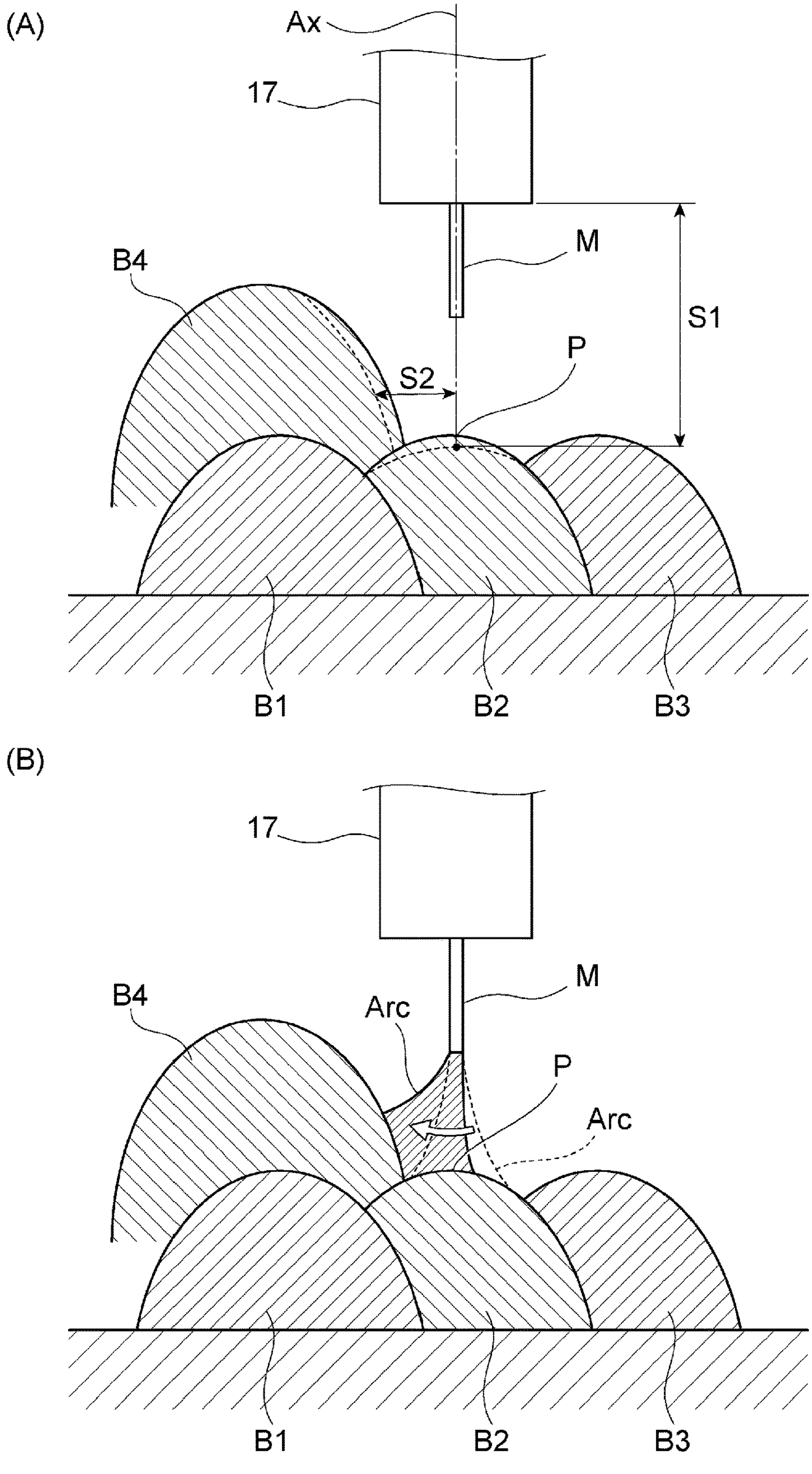
FIG. 14 is an explanatory diagram showing changes in a welding state by (A) and (B) when there is an error in the measured bead shape.

FIG. 14 is an explanatory diagram showing changes in a welding state by (A) and (B) when there is an error in the measured bead shape.

As shown in (A) of FIG. 14, if a measurement error occurs in the shapes of the existing weld beads B2 and B4 near the torch target position P, a distance S1 between the weld bead B2 and a torch tip position and a distance S2 between the weld bead B4 and the target position P will differ from assumed distances. In this case, as shown in (B) of FIG. 14, The arc Arc becomes unstable, such as when an actual protrusion length (exposed length) of the filler metal M changes and the arc Arc is displaced according to a distance between the surrounding existing weld bead and the filler metal M. As a result, there is a risk that shape accuracy of the weld bead to be formed is lowered.

Figure 15:
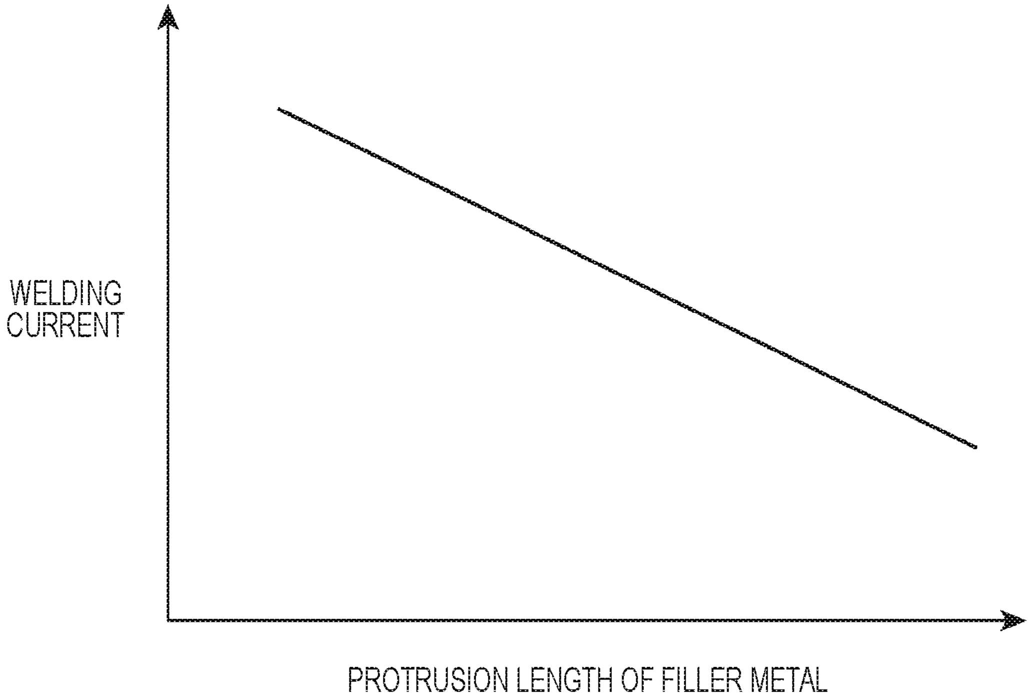
FIG. 15 is a graph schematically showing a change characteristic of a welding current with respect to a protrusion length of a filler metal.

FIG. 15 is a graph schematically showing a change characteristic of the welding current with respect to the protrusion length of the filler metal.

A change in the protrusion length of the filler metal M not only causes the generated arc to become unstable, but also affects the welding current. That is, the longer the protrusion length, the smaller the welding current, and the smaller the formed weld bead tends to be. Therefore, as described above, by measuring the shape of the existing weld bead with high accuracy, fluctuations in the welding conditions can be reduced and a highly accurate weld bead can be formed.

<Shape Model of Weld Bead>

In the above, the shape of the weld bead is expressed using the bead height, the bead width, and thfe cross-sectional shape approximation curve indicating the bead cross-sectional area the bead outer shape of the weld bead, but parameters indicating the shape are not limited to these.

For example, in a literature (B M Berezovskii and A V Stikahin, Optimization of the formation of a metal layer in arc deposition, Welding International, 1991, 5(11), pp. 888-891), the bead shape is expressed by various parameters such as a bead width, a height from a base surface to a bead top portion, a curvature R of the bead top portion, a contact angle φ of the weld bead with a base, and a distance between axes of torch positions forming a pair of adjacent weld beads. The present additive manufacturing method may also be configured to change the deposition track plan and the welding conditions using the parameters as described above.

As described above, the present invention is not limited to the above embodiments, and combinations of the respective configurations of the embodiments, or changes and applications made by those skilled in the art based on the description of the specification and the well-known technology are also intended by the present invention and are included within the scope to be protected.

As discussed above, the present specification discloses as follows.

(1) An additive manufacturing method of depositing weld beads formed by melting and solidifying a filler metal while moving a welding torch attached to a robot tip shaft, the additive manufacturing method including:

a step of measuring a shape profile of an existing weld bead by a non-contact shape sensor provided on the robot tip shaft integrally with the welding torch, during manufacture of an additively-manufactured object by forming the weld beads, based on a deposition track plan that defines a target position of the welding torch and a shape of the weld beads;

a step of extracting first geometric information of a bead shape from the shape profile and the target position of the welding torch;

a step of extracting second geometric information corresponding to the first geometric information from the deposition track plan and calculating a deviation amount between the first geometric information and the second geometric information;

a step of updating the deposition track plan by changing at least one of a bead height and a bead width in a cross section perpendicular to a bead longitudinal direction of the weld bead defined by the deposition track plan, according to the deviation amount; and a step of changing welding condition according to an update result of the deposition track plan.

According to this additive manufacturing method, since the deposition track plan and the welding conditions are changed so as to reduce the deviation amount between the first geometric information indicating the shape of the formed weld bead and the second geometric information indicating the target shape, the shape of the formed weld bead can be more accurately matched with the target shape.

(2) The additive manufacturing method according to (1), in which the first geometric information and the second geometric information include information on at least one of a geometric feature point near the target position of the welding torch, the bead height, the bead width, a bead cross-sectional area of the weld bead, or a cross-sectional shape approximation curve indicating a bead outer shape of the weld bead.

According to this additive manufacturing method, by using various parameters, the shape of the weld bead can be specified, so as to contribute to more accurate formation of the weld bead.

(3) The additive manufacturing method according to (2), in which the geometric feature point includes any one of an apex of a convex shape of the existing weld bead, an end point of a narrowed portion formed by recessing a bead outer surface inward between the weld bead and another weld bead adjacent to the weld bead, or a point where an end portion of the weld bead in a width direction and a lower layer surface on which the weld bead is formed intersect.

According to this additive manufacturing method, each point can be relatively easily detected by including representative feature points of the existing weld bead, and the information can be easily used for control.

(4) The additive manufacturing method according to (2) or (3), in which the geometric feature point is extracted from the existing weld bead located near the target position of the welding torch.

According to this additive manufacturing method, the shape of the weld bead to be formed can be controlled more accurately by extracting the geometric feature points from the existing weld bead in the vicinity of the bead forming position.

(5) The additive manufacturing method according to any one of (1) to (4), in which in the step of changing the welding condition, at least one or a combination of two or more of a position of the welding torch, a posture of the welding torch, a welding speed, a welding voltage, a welding current, and a feeding speed of the filler metal is changed.

According to this additive manufacturing method, the weld bead can be appropriately controlled by various welding conditions.

(6) The additive manufacturing method according to any one of (1) to (5), in which the shape profile is a profile projected and transformed onto a plane including an axis of the welding torch, which is inclined at a predetermined angle from a plane parallel to a detection direction of the weld bead by the non-contact shape sensor.

According to this additive manufacturing method, an accurate profile can be obtained by matching the axial direction of the sensor coordinate system of the non-contact shape sensor with the axial direction of the robot coordinate system used when forming the weld bead.

(7) The additive manufacturing method according to any one of (1) to (6), in which a difference between a cross-sectional area of a target shape of the weld bead defined by the deposition track plan and a cross-sectional area of the weld bead obtained from the shape profile in the cross section perpendicular to the longitudinal direction of the weld bead is set as the deviation amount.

According to this additive manufacturing method, even if the shape profile has a large difference from the local target shape, the deviation amount can be reduced without being greatly affected by this local shape difference.

(8) The additive manufacturing method according to any one of (1) to (6), in which a cross-sectional shape approximation curve is obtained by approximating the shape profile in the cross section perpendicular to the longitudinal direction of the weld bead to a curve model by regression calculation, and a difference between a cross-sectional area surrounded by the cross-sectional shape approximation curve and a cross-sectional area of a target shape of the weld bead defined by the deposition track plan is set as the deviation amount.

According to this additive manufacturing method, by approximating the shape profile to the curve model, it is possible to obtain a cross-sectional shape approximation curve in which variation in the shape measurement of the weld bead is reduced. Even with a small number of measurement points, a cross-sectional shape approximation curve with increased accuracy can be obtained. By changing the deposition track plan and the welding conditions according to a cross-sectional area difference between this cross-sectional shape approximation curve and the target shape, a more accurate weld bead can be formed.

(9) The additive manufacturing method according to any one of (1) to (6), in which a cross-sectional shape approximation curve obtained by approximating the shape profile in the cross section perpendicular to the longitudinal direction of the weld bead to a curve model by regression calculation, is set so that a cross-sectional area of a region surrounded by the cross-sectional shape approximation curve and a cross-sectional area of a target shape of the weld bead defined by the deposition track plan are equal, and a difference between a position of a topmost portion of the cross-sectional shape approximation curve and a target formation position of the weld bead is set as the deviation amount.

According to this additive manufacturing method, since the cross-sectional shape approximation curve is obtained with the constraint that the cross-sectional area difference is reduced, and the difference between the position of the topmost portion of the cross-sectional shape approximation curve obtained and the target formation position of the weld bead is controlled to be reduced, a more accurate weld bead can be formed.

(10) The additive manufacturing method according to any one of (1) to (6), in which a difference between a cross-sectional area of a target shape of the weld bead defined by the deposition track plan and a cross-sectional area of the weld bead obtained from the shape profile in the cross section perpendicular to the longitudinal direction of the weld bead is set as the deviation amount.

According to this additive manufacturing method, by controlling the difference between the measured bead height of the weld bead and the bead height of the target shape to be reduced, the weld bead can be brought closer to the target shape relatively easily without complicated arithmetic processing.

(11) The additive manufacturing method according to any one of (1) to (6), in which a cross-sectional shape approximation curve is obtained by approximating the shape profile in the cross section perpendicular to the longitudinal direction of the weld bead to a curve model by regression calculation, and a difference between a height of an optional point on the cross-sectional shape approximation curve and a height of a position corresponding to the optional point on a target shape of the weld bead defined by the deposition track plan is set as the deviation amount.

According to this additive manufacturing method, by approximating the shape profile to the curve model, it is possible to obtain a cross-sectional shape approximation curve in which the variation in the shape measurement of the weld bead is reduced. Even with a small number of measurement points, a cross-sectional shape approximation curve with increased accuracy can be obtained. A more accurate weld bead can be formed by changing the deposition track plan and the welding conditions according to the difference between the height of an optional point on the cross-sectional shape approximation curve and the height of the outline of the target shape.

(12) The additive manufacturing method according to any one of (1) to (6), in which a cross-sectional shape approximation curve obtained by approximating the shape profile in the cross section perpendicular to the longitudinal direction of the weld bead to a curve model by regression calculation, is set so that a difference between a height of an optional point on the cross-sectional shape approximation curve and a height of a position corresponding to the optional point on a target shape of the weld bead defined by the deposition track plan is small, and a difference between a position of a topmost portion of the cross-sectional shape approximation curve and a target formation position of the weld bead is set as the deviation amount.

According to this additive manufacturing method, since the cross-sectional shape approximation curve is obtained with the constraint that the bead height is reduced, and the difference between the position of the topmost portion of the cross-sectional shape approximation curve obtained and the target formation position of the weld bead is controlled to be reduced, a more accurate weld bead can be formed.

Note that the present application is based on a Japanese patent application (No. 2020-88114) filed on May 20, 2020, contents of which are incorporated by reference in the present application.

REFERENCE SIGNS LIST

11: manufacturing device
13: controller
15: power supply device
17: welding torch
19: welding robot
21: filler metal supply unit
23: laser shape sensor (non-contact shape sensor)
23A: laser emitting unit
23B: detection sensor
25: base portion
31: CAD/CAM unit
33: track calculation unit
35: storage unit
37: control unit
100: additive manufacturing device

The invention claimed is:

1. An additive manufacturing method of depositing weld beads formed by melting and solidifying a filler metal while moving a welding torch attached to a robot tip shaft, the additive manufacturing method comprising:

a step of measuring a shape profile of an existing weld bead by a non-contact shape sensor provided on the robot tip shaft integrally with the welding torch, during manufacture of an additively-manufactured object by forming the weld beads, based on a stored deposition track plan based on predetermined shape data of the additively-manufactured object and comprising a program for manufacturing the additively-manufactured object, the deposition track plan defining a target position of the welding torch and a shape of the weld beads;

a step of extracting first geometric information of a bead shape from the shape profile and the target position of the welding torch;

a step of extracting second geometric information corresponding to the first geometric information from the deposition track plan and calculating a deviation amount between the first geometric information and the second geometric information;

a step of updating the deposition track plan by changing at least one of a bead height and a bead width in a cross section perpendicular to a bead longitudinal direction of the weld bead defined by the deposition track plan, according to the deviation amount; and a step of changing a welding condition according to an update result of the deposition track plan, wherein the first geometric information and the second geometric information include information on at least a geometric feature point near the target position of the welding torch, and the geometric feature point includes an end point of a narrowed portion formed by recessing a bead outer surface inward between the weld bead and another weld bead adjacent to the weld bead.

2. The additive manufacturing method according to claim 1, wherein the geometric feature point is extracted from the existing weld bead located near the target position of the welding torch.

3. The additive manufacturing method according to claim 1, wherein in the step of changing the welding condition, at least one or a combination of two or more of a position of the welding torch, a posture of the welding torch, a welding speed, a welding voltage, a welding current, and a feeding speed of the filler metal is changed.

4. The additive manufacturing method according to claim 1, wherein the shape profile is a cross-sectional shape of the existing weld bead including an axis of the welding torch at the target position of the welding torch, which is inclined at a predetermined angle from a plane parallel to a detection direction of the weld bead by the non-contact shape sensor.

5. The additive manufacturing method according to claim 4, wherein the geometric feature point is extracted from the existing weld bead located near the target position of the welding torch.

6. The additive manufacturing method according to claim 4, wherein in the step of changing the welding condition, at least one or a combination of two or more of a position of the welding torch, a posture of the welding torch, a welding speed, a welding voltage, a welding current, or a feeding speed of the filler metal is changed.

7. The additive manufacturing method according to claim 2, wherein in the step of changing the welding condition, at least one or a combination of two or more of a position of the welding torch, a posture of the welding torch, a welding speed, a welding voltage, a welding current, and a feeding speed of the filler metal is changed.

8. The additive manufacturing method according to claim 1, wherein the geometric feature point includes a point where an end portion of the weld bead in a width direction and a lower layer surface on which the weld bead is formed intersect.

9. An additive manufacturing method of depositing weld beads formed by melting and solidifying a filler metal while moving a welding torch attached to a robot tip shaft, the additive manufacturing method comprising:

a step of measuring a shape profile of an existing weld bead by a non-contact shape sensor provided on the robot tip shaft integrally with the welding torch, during manufacture of an additively-manufactured object by forming the weld beads, based on a stored deposition track plan based on predetermined shape data of the additively-manufactured object and comprising a program for manufacturing the additively-manufactured object, the deposition track plan defining a target position of the welding torch and a shape of the weld beads;

a step of extracting first geometric information of a bead shape from the shape profile and the target position of the welding torch;

a step of extracting second geometric information corresponding to the first geometric information from the deposition track plan and calculating a deviation amount between the first geometric information and the second geometric information;

a step of updating the deposition track plan by changing at least one of a bead height and a bead width in a cross section perpendicular to a bead longitudinal direction of the weld bead defined by the deposition track plan, according to the deviation amount; and a step of changing a welding condition according to an update result of the deposition track plan, wherein the first geometric information and the second geometric information include information on at least a geometric feature point near the target position of the welding torch, and the geometric feature point includes an apex of a convex shape of the existing weld bead, an end point of a narrowed portion formed by recessing a bead outer surface inward between the weld bead and another weld bead adjacent to the weld bead, and a point where an end portion of the weld bead in a width direction and a lower layer surface on which the weld bead is formed intersect.

* * * * *